(12) United States Patent
Schwartz

(10) Patent No.: US 6,708,331 B1
(45) Date of Patent: Mar. 16, 2004

(54) METHOD FOR AUTOMATIC PARALLELIZATION OF SOFTWARE

(76) Inventor: Leon Schwartz, Rechov HaBanim, 3a, Zichron Yaakov, 30900 (IL)

(*) Notice: Subject to any disclaimer, the term of this patent is extended or adjusted under 35 U.S.C. 154(b) by 419 days.

(21) Appl. No.: 09/684,666

(22) Filed: Oct. 6, 2000

Related U.S. Application Data

(60) Provisional application No. 60/201,444, filed on May 3, 2000.

(51) Int. Cl.[7] ............................................. G06F 9/45
(52) U.S. Cl. .................................................. 717/160
(58) Field of Search ............................. 717/124–133, 717/149–161; 710/269; 709/331; 711/113

(56) References Cited

U.S. PATENT DOCUMENTS

| | | | | |
|---|---|---|---|---|
| 4,636,942 A | * | 1/1987 | Chen et al. | 710/269 |
| 4,710,872 A | * | 12/1987 | Scarborough | 717/160 |
| 5,093,916 A | * | 3/1992 | Karp et al. | 709/331 |
| 5,388,242 A | * | 2/1995 | Jewett | 711/113 |
| 5,452,461 A | * | 9/1995 | Umekita et al. | 717/149 |
| 5,535,393 A | * | 7/1996 | Reeve et al. | 717/149 |
| 5,802,375 A | * | 9/1998 | Ngo et al. | 717/160 |
| 6,460,176 B1 | * | 10/2002 | Suehiro et al. | 717/119 |
| 6,539,542 B1 | * | 3/2003 | Cousins et al. | 717/151 |

OTHER PUBLICATIONS

Winsborough W. Hale, "Automatic, Transparent parallelization of logic programs at compile time", 1988, UMI, University of Wisconsin,vol. 49/11–B Dissertation Abstracts International, pp. 4910–286 pages.*

Gehani N. H., "Concurrency in ADA and Multicomputers", Bell Laboratories, 1982, Comp. Lang. vol. 7, pp. 21–23.*

* cited by examiner

*Primary Examiner*—Todd Ingberg
*Assistant Examiner*—Tuan Anh Vu
(74) *Attorney, Agent, or Firm*—John De La Rosa

(57) ABSTRACT

The invention provides a scalable, automated, network friendly method for building parallel applications from embarrassingly parallel serial programs. Briefly, the steps of an exemplary method in this invention are as follows: First, the application loops with significant potential parallelism are identified. Second, from the set of loops identified, those loops which can statically be shown to not be parallelizable are disqualified. Next, the program is transformed into a parallel form in which the remaining identified loops are optimistically parallelized and packaged into per-iteration functions. Then, shared memory in the functions is relocated to a shared memory section available to all computers and references to the shared memory in the source code are transformed into indirect accesses. Finally, the per-iteration functions are spawned on to multiple computers, at run-time, where each computer is given a range of iteration.

10 Claims, 6 Drawing Sheets

ORIGINAL PROGRAM

```
int A[3]; // shared aggregate
int *i;
A[0] = 2;
i = &A[1];
i[0] = 3;
i[1] = 4;
```

```
int *(*A) [3] =
int **i;
*(*A) [0] = 2;
i = &A[1];
*i[0] = 3;
*i[1] = 4;
```

TRANSFORMED PROGRAM

ORIGINAL PROGRAM

INDIRECTION TRANSFORMATION

INITIALIZATION TO SHARED MEMORY

INITIALIZED SHARED SCALAR

```
int x; // shared var
int y = 5; // shared var
int z = y * 2;
```

INITIALIZATION AFTER SHARING TRANSFORMATION

```
int (*x) = (int*)shcreate();
int (*y) = (int*)shcreate();
   _1 = (*y) = 5;
int z = (*y) * 2;
```

INITIALIZED SHARED AGGREGATE struct agg { int i; char c; };
struct agg y = { 1, 'd' }; // shared aggregate

INITIALIZATION AFTER SHARING TRANSFORMATION struct agg { int i; char c; };
struct agg (*y) = (agg*)shcreate(),
  __1 = { (*y).i = 1, (*y).c = 'd' };

ORIGINAL PROGRAM

```
int A [3]; // shared aggregate
int *i;
A [0] = 2;
i = &A [1];
i [0] = 3;
i [1] = 4;
```

TRANSFORMED PROGRAM

```
int *(*A) [3] =
int **i;
*(*A) [0] = 2;
i = &A [1];
*i [0] = 3;
*i [1] = 4;
```

ORIGINAL PROGRAM struct agg { int i; char c; };
struct agg y; // shared aggregate

LOCAL

| y.i = 1 |
| y.c = 'd' |

TRANSFORMED PROGRAM struct agg { int i; char c; };
struct agg_p { int *i; char *c; };
struct agg_p (*y) = (agg_p*)shcreate( ... );

METHOD FOR AUTOMATIC PARALLELIZATION OF SOFTWARE

This application claims the benefit of U.S. Provisional Application No. 60/201,444 filed May 3, 2000 entitled Automatic Parallelization: An Incremental, Optimistic Practical Approach," which is incorporated herein by reference.

FIELD OF THE INVENTION

The present invention relates generally to parallel programs, and specifically, to a method for automatic parallelization of certain programs.

BACKGROUND OF THE INVENTION

Parallel programming is a difficult and expensive process. While tools have been developed to assist with parallelization, these tools still require that the user have a deep knowledge of parallelization—a topic not within the grasp of most users who could benefit from parallelizing, especially when the programs at issue are inherently parallel. Furthermore, the target platforms for these programs is often a specialty multiprocessing computer.

A program which is inherently parallel implements algorithms that lend themselves to straightforward parallel implementation. This type of program does not require use of a specialty multiprocessing computer, and can be effectively implemented on a network of workstations (NOW) instead. In parallelizing programs for a NOW, a number of difficulties arise: communication is not cheap, faults and slowdowns are common, and machines may join and leave the computation at any time.

The most straightforward way to provide for communication in a parallel program is through the use of a shared memory. This is easy to implement on a multiprocessor, because every memory location has a unique id in the global address space. On a NOW, a software layer called a Distributed Shared Memory (DSM) can create an illusion of a physical global address space.

Further, a method known as Two-Phase Idempotent Eager Scheduling (TIES) was created to address the problem of slowdowns and failures, as well as machines joining and leaving computation, when parallelizing on a NOW. The traditional method of parallelization called for division of a sequential application into alternating serial and parallel steps. Each parallel step was composed of a number of independent threads of control that could be executed simultaneously. While serial steps would be executed locally, individual threads of parallel steps were scheduled on available processors. When the last thread terminates, the parallel step is finished. The TIES system instead simultaneously assigns several copies of individual threads to several machines to guarantee termination as long as at least one continues to progress. When the first has successfully reported the results, the other machines are freed for other tasks. In order to guarantee correctness, the starting memory state must be identical for each copy, and thus, this original memory state is preserved until the parallel step has successfully concluded. Not only does this address the issues of failure and slowdown and machines joining and leaving the computation, but also the TIES scheme minimizes communications during the parallel step because the complete memory image for each thread is available at the start of the parallel step.

An embarrassingly parallel program is a program whose execution time is dominated by a small number of coarse-grained parallel loops. The lack of internode communication requirements within the main loops of the programs is ideal for use with the TIES methodology, where no inter-iteration communication is permitted.

Another problem that arises in parallelization is the issue of data dependence, which occurs particularly if two iterations access the same memory location and at least one access is a write. Some dependencies can be satisfied through a technique called privatization, which allocates individual copies of a variable to each loop iteration. However, if an earlier iteration writes a value which is to be read by a later iteration, a flow dependence is indicated, and a loop containing this type of dependence may not be parallelizable. A dependence may also be categorized as either loop-independent, if it exists independently of any loop inside which it is nested, or loop-carried, if not. While a loop-independent dependence does not inhibit parallelization, a loop-carried dependence may inhibit parallelization.

Detecting dependencies has traditionally been done by comparing each possibly overlapping array reference with every other. Array summarization techniques, representing aggregate activity for a set of accesses have been proposed. However, in real world applications, flow dependence has been shown to be undecidable. In part, this is because static analysis cannot completely address analysis issues which arise in complex real-world applications.

The following program illustrates this problem.

```
main ( int argc, char *argv )
{
    extern int *A;
    for ( int i = 0; i < 5; i += argc )
        A[i] = A[i + atoi(argv[1])];
}
```

The main loop of this program has different dependencies depending on the runtime value of argv[1]. If argv[1] is between −5 and −1, there is a loop-carried flow dependence. If argv[1] is between 1 and 5, there is a loop-carried anti-dependence, which means an earlier iteration reads a value which is written by a later iteration. If argv[1] is 0, there is a loop-independent flow dependence. Other values of argv[1] show no dependence. Clearly static analysis may not be able to provide sufficient information to permit parallelization.

Because static analysis is not adequate, various approaches of runtime analysis have been suggested. In the previous example, a runtime test on the value of argv[1] Would determine whether a serial or parallel version of the loop was selected. One strategy is to use "inspector loops", or side-effect-free skeletons of the original loop in which address calculations are performed. The inspector loop executes quickly, and then the pattern of memory accesses can be used to allow or disallow parallelization of the original loop. The drawback to this strategy is that the inspector loop may be difficult or impractical to extract. Another strategy is speculative parallelization, in which the loops are parallelized with possible dependencies, the actual existence of which is checked at run-time. A shadow array is allocated for every array that might contain a flow dependence. As the elements in the original array are accessed, the shadow array records the access type. When the parallel step is over, the access patterns of all iterations can be compared to determine if there is an actual flow dependence. If it turns out to be illegal, a backup copy of the shared memory is used to re-execute the loop sequentially.

Drawbacks to this method include mangling of code and high overhead for parallelization of coarse grained loops.

Thus, a method that will automatically parallelize code for implementation on a NOW, while avoiding the problems and drawbacks detailed above is desirable.

SUMMARY OF THE INVENTION

The present invention provides a scalable, automated, network friendly method for building parallel applications from embarrassingly parallel serial programs. The steps of an exemplary method follow: First, the application loops with significant potential parallelism are identified. Second, from the set of loops identified, those loops which can statically be shown to not be parallelizable are disqualified. Next, the program is transformed into a parallel form in which the remaining identified loops are optimistically parallelized and packaged into per-iteration functions. Variables that need to be shared are segregated into a particular section of memory via simple source code transformation. The previous steps are performed by the compiler, which further inserts calls to the runtime system for scheduling and shared memory allocation and set-up.

The server application, then, contains all code outside of any parallel loop as well as calls to the scheduling subsystem that replace the parallelized loop. The client applications contain the loop bodies of the parallelized loops (per-iteration functions) Each client application is constructed to accept a consecutive range of iteration space as well as the iteration step as input parameters.

At run-time, many copies of the per-iteration functions are spawned on different machines to simultaneously perform different iteration ranges. The shared memory segment is available to all the machines through DSM. During execution, the memory access statistics on the granularity of individual data types are collected as the loop iterations are performed. As the ranges of iterations are concluded, shared memory updates and access statistics are returned to the memory server. The server then dynamically checks that no memory dependencies were in fact violated. If a violation is detected, the program can either abort in ordinary applications or can gracefully continue serially in sensitive applications. In subsequent runs, the program is re-parallelized, but the parallelization of the offending loop is disabled. Information obtained through the program failures is entered into a program database which guides future re-parallelizations.

These, as well as other features and advantages of the present invention, will become apparent to those of ordinary skill in the art by reading the following detailed description, with appropriate reference to the accompanying drawings.

BRIEF DESCRIPTION OF THE DRAWINGS

The invention will now be described by way of example only with reference to the accompanying drawings, in which.

DETAILED DESCRIPTION OF THE PREFERRED EMBODIMENTS

The first step is to determine what to parallelize—in this case, coarse-grained loops. Coarse-grained loops are preferred because they ensure a high ratio of work to overhead, because the overhead is greatly pronounced when implementing on a NOW. The loop tree of a procedure is a root node plus one node for each loop, with edges connecting each node to all loops which it directly contains. The program loop graph is the graph obtained by adding a connecting edge from each loop tree node to the root of the loop tree for each function called from that node. Global Recursion Level Analysis (GRLA) is an interprocedural analysis technique that uses the Program Call Graph and the Control Flow Graph of each procedure to assign staging levels indicating relative frequency of execution to each block of code.

In one example of this method, GRLA is started by assigning staging levels at the leaves of the program loop graph, which are each assigned level 0. The stage level of each inner loop is one more than the meet of each of its constituent loops. In the case of a root loop tree node, it is precisely the meet of the staging levels of all inner loops. When the staging levels have been assigned, the coarsest grained loops will be the ones with the highest lattice values. In the event that unused functions are present within a program, this analysis will discover a number of "main" functions, and it takes the highest-labeled function as the main function.

Within this main function, there are likely to be statements, function calls, and loops. Individual statements and low-numbered function calls and loops are ignored. Loops with high level are considered for parallelization and functions with high level are recursively examined. The main function is thus divided up into a sequence of alternating sequential code and parallelizable loops.

```
void ramdomFill ( float M[SIZE] [SIZE] )
{
    for ( int i = 0 ; i < SIZE; i++ )
        for ( int j = 0; j < SIZE j++ )
            M[i][j] = (drand48 () - 0.5 ) * 1000.;
}
void print (float M[SIZE][SIZE] )
{
    for ( int i = 0; i < SIZE; ++ )
    {
        for ( int j = 0; j < SIZE; j++ )
            Printf ( "%f\t", M[i][j];
        printf ( "\n" ) ;
    }
}
void mmult ( float A[SIZE][SIZE], float B[SIZE][SIZE],
float C[SIZE][SIZE] )
{
    for ( int i = 0; i < SIZE; i++ )
    for ( int j = 0 ; j < SIZE; j++ )
    {
        C[i][j] = 0.;
        For ( int k = 0; k < SIZE; k++ )
            C[i][j] += (A[i][k] * B[k][j] );
    }
}
void main ( int argc, char * argv [] )
{
    float A[SIZE][SIZE], B[SIZE][SIZE], C[SIZE][SIZE];
    srand48 ( 0 );
    randomFill ( A );
    randomFill ( B );
```

```
    mmult (A, B, C);
    printf ( "Martix A: \n" );
    print ( A );
    printf ( "Matrix B: \n");
    print (B );
    printf ( "Matrix A x B:\n" );
    print ( C);
}
```

Figure 1:
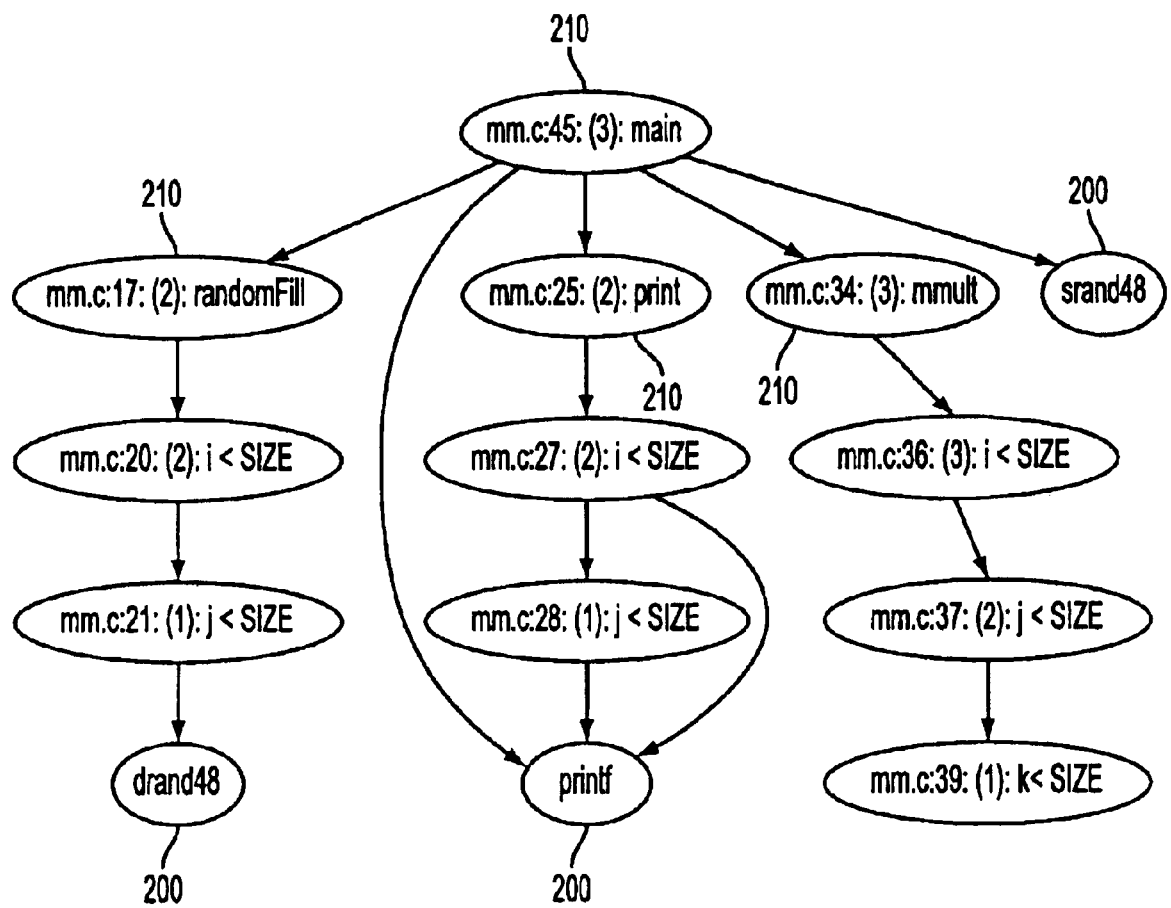
FIG. 1 is an example of an interprocedural loop level graph.

The Program Loop Level Graph is one manner to graphically represent the preceding dataflow analysis, by extending the Program Call Graph to make loop nesting explicit. For the exemplary program shown above, the resulting Loop Level Graph is shown in FIG. 1. The nodes srand48, drand48, and print 200 are undefined library functions and are not considered in the analysis. For all other nodes, the number in parenthesis represents the loop level. The nodes main, mmult, print, and randomFill 210 represent the nominal outer loops of their respective functions. Each of the functions mmult, print, and randomFill are assigned the same level as the single loop they contain, whereas main is assigned the maximum level of all loop levels it encloses.

Traversing the graph allows efficient assignment of a loop-nesting level to each loop of each function, the highest are the coarsest grain loops. The most expensive program loops are determined using two major steps: assigning loop levels to each loop and finding the maximum of these over the entire program.

The nesting level algorithm is as follows:

```
SetNests ( Loop loop, bool nest )
{
    int funcs = 0; nests = 0;
    for ( i in loop.calls )
        funcs = max ( i.loop.nesting, funcs);
    for ( i in loop.inner )
    {
        SetNests ( i, true );
        nests = max ( i.nesting, nests );
    }
    loop.nesting = max (funcs, nests) + nest;
}
```

Every function contains an outer loop with a nesting level of 0, which is merely a container for the function body. The algorithm begins by taking the maximum loop nesting level of all functions called within the loop, and then calls itself recursively for each inner loop to find the maximum loop nesting level over all inner loops. Finally it assigns the loop nesting level as the maximum of the function nesting level and the inner loop nesting level, with one added if this is a recursive call (an actual inner loop). The SetNests function is applied to each function separately, in reverse topological order based on the call graph.

Finding the costliest loops proceeds using the following algorithm:

```
FindCostly ( Loop loop, int threshold, Loops costly )
{
    for ( i in loop.lcalls)
        if ( i not a recursive call )
            FindCostly ( i.loop, threshold, costly );
    for ( i in loop.inner )
        if ( i.nesting > threshold )
            costly += i;
}
```

The algorithm checks for recursive cycles in the call graph and does not follow them. For every other loop call, it calls itself recursively on the function's outer loop. At the bottom level of the recursion, all 0-level outer function loops have been explored, and the algorithm simply checks every inner loop of every function loop and returns the ones that exceed some nesting threshold. One good heuristic seems to be to consider all outer loops with a nesting level within 2 units of the maximum level found at the outer loop of the main function.

Once coarse-grained loops are identified, these loops are then analyzed for parallelizability. This involves minimal testing for a non-exhaustive list of disqualifying conditions including: input operations or other system calls; termination conditions where are inherently sequential; premature loop exit conditions; non-local transfers of control; obvious loop-carried flow-dependence; and obvious allocation of memory without corresponding deallocation. At this point, user can be notified of which loop was a desirable parallelism candidate and the grounds for its disqualification, allowing the user to remove or modify the offending code. The final result of the preceding is a maximal set of parallelizable coarse-grained loops present in the input program.

Once parallelizable loops have been identified, the interprocedural shared variables must be identified. Variables which occur within a parallel loop body and elsewhere are clearly shared. It is not so clear whether addressed variables and heap memory are shared, but a conservative approach is to label all of these instances as shared. To determine what variables are referenced within a parallel loop, the following algorithm is called on each parallel loop candidate:

```
LoopRefs ( Loop loop, Set refs )
{
    refs += loop.lrefs;
    for ( i in loop.inner )
        LoopRefs ( i, refs );
    for ( i in loop.lcalls )
        LoopRefs ( i.loop, refs );
}
```

For each candidate loop, the algorithm adds locally referenced variables, plus the results of calling itself recursively on each of its inner loops and the nominal outer loop of each of the functions it calls. Further, all variables addressed anywhere in the program can be added, unless it is proven that the address never crosses a parallel loop boundary. From this list of possibly shared variables, only those live outside the loop body are selected.

It is difficult to keep a DSM system simple and efficient if it must manage an unlimited number of tiny shared memory segments, so it is customary to aggregate all shared data into a single place. Unless the program was designed with this notion, the shared memory segment will be composed of variables which are arbitrarily scattered across the application. To comply with DSM semantics, these variables must be collected into a single contiguous shared data segment. To accomplish this with minimal drawbacks, a program transformation is used to add an extra level of indirection to each shared variable declaration and usage, thus maintaining the semantics of the original program while placing the shared variables all together in a single memory segment for DSM.

Figure 2A:
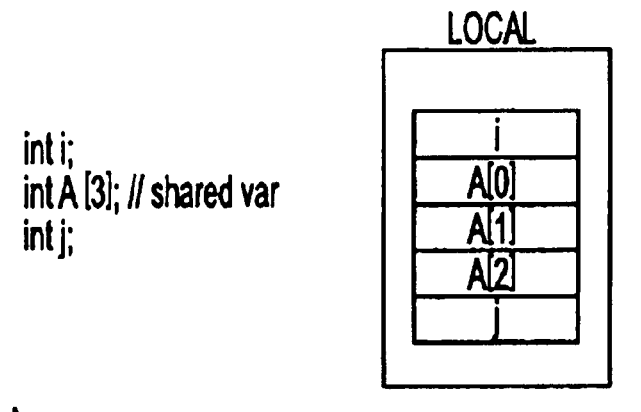
FIG. 2 is a diagram illustrating shared variable transformation.
Figure 2B:
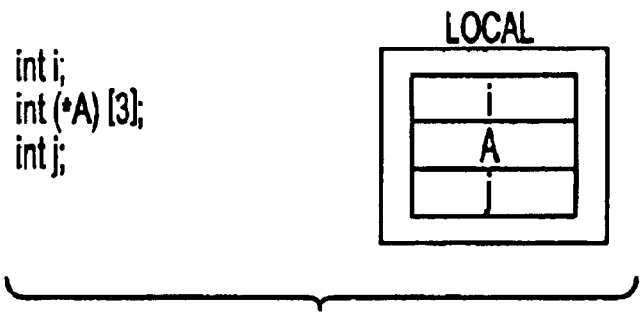
Figure 2C:
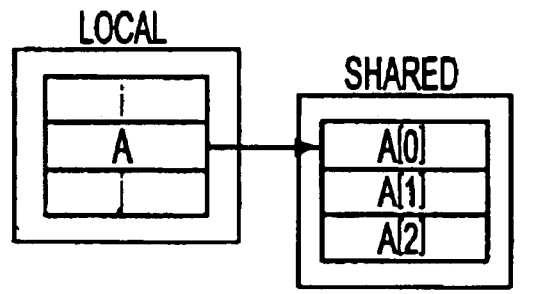

To avoid variable reshuffling at the source code level, one level of indirection is added to each shared variable declaration. For example, as in FIG. 2(a), the array A is found to be shared. FIG. 2(b) demonstrates a level of indirection added to the declaration. Finally, taking advantage of the flexibility of C++ to defer initializations until run-time, all shared variables are initialized at declaration to point to the area of shared memory returned by the static shared memory allocation function shcreate ( ), as in FIG. 2(c).

Figure 3A:
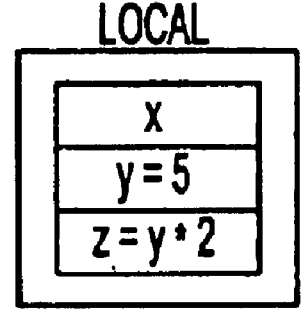
FIG. 3 illustrates scalar initializations.
Figure 3B:
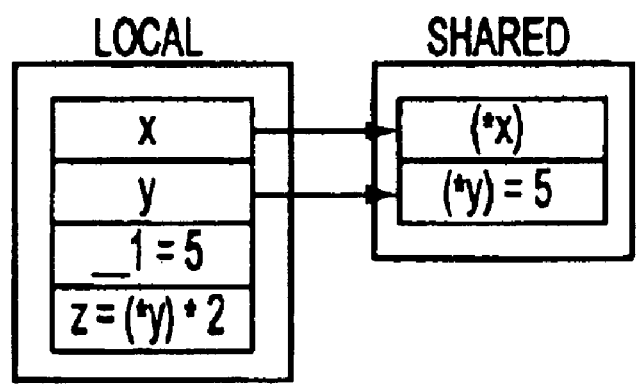
Figure 4A:
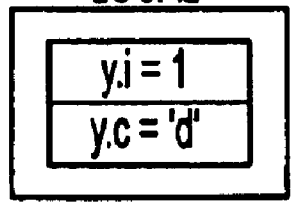
FIG. 4 illustrates aggregate initializations.
Figure 4B:
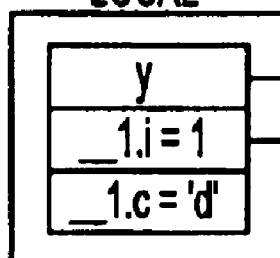
Figure 4B:
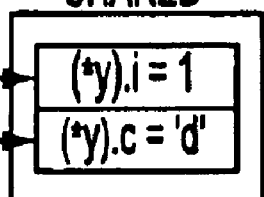

Turning to variable initializations, declarations of variables may use the initialized value of previously declared variables, as in FIG. 3(a). To provide a way of initializing the variable at declaration in the transformed code, a dummy variable is introduced, as shown in FIG. 3(b). This initialization technique works as well for aggregates, as is shown in FIG. 4.

Every shared variable can be initialized consistently in this manner, with the exception of procedure parameters. Shared parameters must be augmented with an additional indirect declaration within the function body, which is then initialized normally and assigned the actual parameter value. The indirect version is then substituted for all uses of the parameter.

Figure 5A:
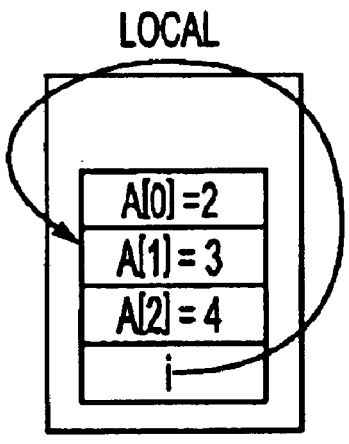
FIG. 5 shows aggregate access types.
Figure 5B:
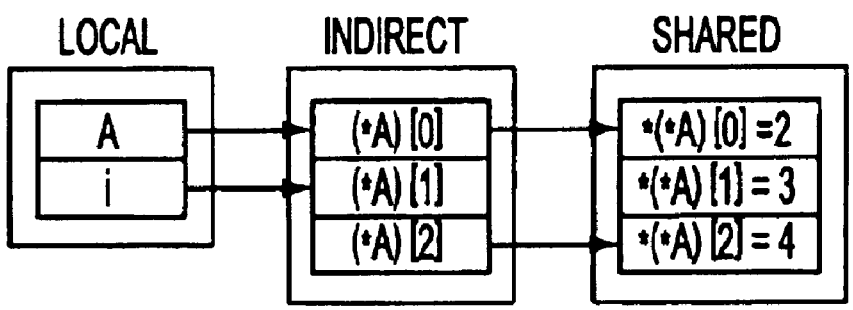

This straightforward procedure must be altered slightly, by adding an additional layer of indirection, in order to make use of the memory profiling scheme that is described later. Aggregate variables must be separated into value context and address context. The value context aggregate is where one of its elements is being referenced, and thus must be transformed; the address context aggregate is where the address of some offset inside the aggregate is being taken, and thus must be preserved. For example, consider FIG. 5. In FIG. 5(a), the first statement assigns to an element of A, or is value context. The second statement assigns the address of A[i] to the variable i, and is an address context. In FIG. 5(b), the appropriate transformations have been made. The sophisticated transformation A must ripple through the code to change every variable which is used to hold an offset of A, including assignments and function call sites.

Figure 6A:
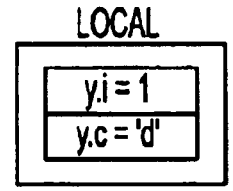
FIG. 6 depicts transforming structure aggregates.
Figure 6B:
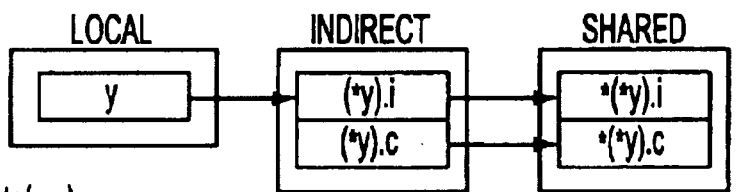

Structure aggregates add an interesting twist because adding indirections at the element level fundamentally changes the data type. Transforming this code to implement speculative sharing (i.e., the memory profiling scheme that is described later) involves generating a new datatype agg_p from agg, where each member is given an indirection, as shown in FIG. 6.

Thus, the program generated by the parallelizer has both a transformed application program, the server, and a number of parallelizable loop mini-apps, the clients., The server application has a call to a scheduling module with loop bounds, step and client application name as arguments in place of each parallel loop. Each mini-app is parameterized by loop iteration count, because many independent copies of it may be spawned at runtime on all available machines. To provide a common shared memory image between all clients within a given parallel step, the shared data is encapsulated into a Network File System (NFS)-mounted file and mapped at both the server and all clients. NFS, a widely available protocol for file sharing, can be used, together with file-mapping kernel primitives, for shared memory management to obtain an effective runtime system.

Because the estimate of which variables must be shared has been made conservatively, the shared memory layout can be precomputed, and then used to determine the precise offset in the shared memory segment where each variable will reside. The first call to the shcreate( ) function allocates the entire memory segment required, subsequent calls merely allocate various pieces to initialize the appropriate variables. On the client side, shopen ( ) performs a similar task, returning the appropriate offset into the same shared memory file for each shared variable.

On the server side, the shared memory file is mapped using the MAP_SHARED flag of the mmap( ) system call because all clients initialize their shared memory segments by mapping in the same memory file and need to be able to see all updates to the shared memory which precede the parallelized loop invocation. Because the client must know the name of the shared memory file and the address to which it was set, information which cannot be passed as arguments to the client application, environment variables communicate these values. At the client, the shared memory is mapped using the MAP_PRIVATE flag of mmap( ), because client execution must remain idempotent and cannot be allowed to write to directly to shared memory space.

To make the best use of the strengths of the NFS protocol, iteration space is partitioned to ensure that a number of different grain sizes are present, and the larger grains (or jobs) cover earlier iterations than later grains. This ensures a proper balance between the conflicting goals of minimizing overhead, via large grains, and achieving proper load balancing, supported by the smaller grains. Every client machine is started with a good sized chunk of work which is estimated to keep it busy for some fraction of the ultimate duration of the parallel step. As some machines finish faster, they can be given the smaller remaining chunks in the remaining time of the parallel step. Because the larger grains compute earlier iterations in the iteration space, the incorporation of the results of these iterations can be overlapped with the computation of later iterations. To support file appends within a parallelizable loop, the appends are stored in temporary files until one of the client copies successfully completes, and then only after all earlier grains of the loop have been completed can all these be combined into one stream.

Upon successful completion of each job, the entire job list is looped through. Jobs may be classified as either "done" or "flushed." All jobs which have already been flushed are skipped; jobs which are not done break the loop. All other jobs encountered on the job list are marked flushed and the corresponding commitments are performed, basically concatenating temporary output files to the appropriate output stream, updating a second copy of the shared memory with the changes recorded in the client-side, and deleting the corresponding temporary files.

Finally, the legitimacy of the parallelization at run-time must be checked. Instead of using shadow arrays, this method uses memory profiling, keeping statistics for every iteration of which locations were read only, read first, and written before being read. By using a granularity that includes several consecutive iterations in each grain, the test need not be performed for every pair of iterations, because within a particular grain, dependencies will be automatically satisfied. Three bits are associated with each memory element: Read-Only, Write-First, and Read/Write. For each read access, if no bits are set Read-Only is marked. For each write-access, if no bits are set, Write-First is marked. Otherwise, if the Read-Only bit is set, the Read/Write is marked.

To provide an efficient, language-independent, platform-independent methodology for element-by-element memory profiling, a methodology called MultiView may be used. See Ayal Itzkovitz et al., "Fine-Grain Distributed Virtual Shared Memory," PCT International Application Number PCT/IL99/00391, which is incorporated herein by reference. Multiview is used for fine-grained memory access control of DSM using standard OS page fault mechanism and can support access faults at the variable level. MultiView constructs separate and independent mappings which map to identical memory areas. This technique can be adapted to provide access statistics for each memory element at every client processor. Rather than handing out pointers to the original mapping space of the shared memory, a separate mapping for each variable is created and the appropriate offset into it is returned. At the beginning of a grain's execution, no read/write permissions are set on any of the mappings. As page faults are generated, the appropriate access is turned on and the appropriate bit set. Locations which are only read or are written before being read will generate only a single page fault. Those that are read before being written will generate two faults. As the parallel grain size increases, the cost of this method decreases significantly, and thus provides a good profiling scheme.

An exemplary embodiment of the present invention has been illustrated and described. It will be understood, however, that changes and modifications may be made to the invention without deviating from the spirit and scope of the invention, as defined by the following claims.

I claim:

1. A method for automatic parallelization of software written in a specific programming language and written for a multiple computer environment comprising:
   (a) identifying a set of loops to be parallelized in a program source code;
   (b) packaging the loops to be parallelized into per-iteration functions;
   (c) reallocating shared memory for variables in the per-iteration functions to a shared memory section available to all computers;
   (d) using the syntax of the specific programming language, transforming references to the variables in the per-iteration functions implementing indirect pointers to the shared memory corresponding to the variables in the per-iteration functions ; and
   (e) spawning the per-iteration functions on multiple computers, at run-time, where each computer is given a range of iteration.

2. The method for automatic parallelization of software in claim 1, further comprising the steps of:
   (a) collecting data about program failures due to memory dependencies determined at run-time and shared memory access; and
   (b) utilizing the collected data to guide subsequent re-parallelization runs.

3. The method for automatic parallelization of software in claim 2, wherein program failures are identified by page faults as determined by a system of fine-grained distributed virtual shared memory.

4. The method for automatic parallelization of software in claim 1, wherein the specific programming language is C++.

5. A method for automatic parallelization of software written in a specific programming language and written for a multiple computer environment comprising:
   (a) identifying a set of outermost loops in a program source code;
   (b) selecting loops to be parallelized from the set of outermost loops by determining loops without loop-carried dependencies;
   (c) packaging the loops to be parallelized into per-iteration functions;
   (d) identifying memory for variables in the loops to be parallelized that is used in an approximated shared fashion;
   (e) relocating the identified memory into a shared memory section for the variables, to be available at run-time to all computers through memory-mapped data files;
   (f) using the syntax of the specific programming language, transforming references to the memory in the program source code for the variables through indirect pointers;
   (g) transforming static declarations into calls to a shared memory allocator;
   (h) spawning the per-iteration functions on multiple machines at run-time where each computer is provided an iteration range;
   (i) collecting memory access statistics on the granularity of individual data types during iteration;
   (j) returning shared memory updates and access statistics to the memory server upon completion of iteration ranges;
   (k) checking to determine if run-time memory dependencies were violated signifying failure, whereby execution can either be aborted or continued serially;
   (l) disabling parallelization of loops violating memory dependencies on subsequent runs; and
   (m) writing information about failure to a database to guide future re-parallelizations.

6. The method for automatic parallelization of software in claim 5, wherein violations of run-time dependencies are identified by page faults as determined by a system of fine-grained distributed virtual shared memory.

7. The method for automatic parallelization of software in claim 5, wherein the specific programming language is C++.

8. A method for transforming software code written in a specific programming language for parallel execution comprising:
   (a) identifying potentially parallelizable loops in a program source code;
   (b) packaging the loops to be parallelized into per-iteration functions;
   (c) replacing the loops in the source code with calls to a scheduling module; and
   (d) using the syntax of the specific programming language, transforming references to variables in the source code stored in shared memory to indirect reference.

9. A method for executing the software code created by the method of claim 8 comprising:
   (a) spawning per-iteration functions on multiple client machines, where each machine is given a range of iteration;
   (b) collecting data about program failures due to memory dependencies; and
   (c) utilizing the collected data to guide subsequent re-parallelization runs.

10. The method for transforming software code in claim 8 wherein the specific programming language is C++.

* * * * *